United States Patent
Parkinson (10) Patent No.: US 8,813,243 B2
(45) Date of Patent: Aug. 19, 2014

(54) REDUCING A SIZE OF A SECURITY-RELATED DATA OBJECT STORED ON A TOKEN

(75) Inventor: Steven William Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 914 days.

(21) Appl. No.: 11/670,661

(22) Filed: Feb. 2, 2007

(65) Prior Publication Data
US 2008/0189543 A1 Aug. 7, 2008

(51) Int. Cl.
*G06F 7/00* (2006.01)

(52) U.S. Cl.
USPC .............. 726/27; 726/2; 726/3; 726/5; 380/1; 380/30; 380/277; 713/155; 713/156; 713/162; 713/171; 713/175; 713/193; 705/76

(58) Field of Classification Search
USPC ............ 726/27; 713/155, 156, 162, 171, 175, 713/193; 727/2, 3, 5, 27; 380/1, 30, 277; 705/76
See application file for complete search history.

(56) References Cited

U.S. PATENT DOCUMENTS

| | | |
|---|---|---|
| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |
| 5,793,868 A * | 8/1998 | Micali .............................. 380/28 |
| 5,862,310 A | 1/1999 | Crawford et al. |
| 5,923,884 A | 7/1999 | Peyret et al. |
| 5,937,066 A | 8/1999 | Gennaro et al. |
| 5,943,423 A | 8/1999 | Muftic |

(Continued)

FOREIGN PATENT DOCUMENTS

| | | |
|---|---|---|
| WO | 9724831 | 7/1997 |
| WO | 0048064 A1 | 8/2000 |
| WO | 2007096590 A1 | 8/2007 |

OTHER PUBLICATIONS

*PKCS#11 v2.20: Cryptographic Token Interface Standard*, RSA Laboratories, Jun. 28, 2004 (see, e.g. Chapter 10, Objects) (see www.rsasecurity.com, 407 pages).

(Continued)

*Primary Examiner* — Beemnet Dada
*Assistant Examiner* — Sayed Beheshti Shirazi
(74) *Attorney, Agent, or Firm* — Lowenstein Sandler LLP (57) ABSTRACT

Embodiments of the present invention provide a method and system, including a client and security token, for reducing a size of a security-related object stored in the token. The object is stored in a storage structure that is indexed according to an identity reference to a certificate associated with the object and a private key identifier identifying a private key assigned to an owner of the token. A request to access an encrypted data object results in accessing the private key identifier in the storage structure using only the identity reference as an index.

13 Claims, 8 Drawing Sheets

(56) References Cited

U.S. PATENT DOCUMENTS

| | | | |
|---|---|---|---|
| 5,991,411 A | 11/1999 | Kaufman et al. | |
| 5,991,882 A | 11/1999 | O'Connell | |
| 6,005,942 A | 12/1999 | Chan et al. | |
| 6,005,945 A * | 12/1999 | Whitehouse | 380/51 |
| 6,011,847 A | 1/2000 | Follendore, III | |
| 6,016,476 A | 1/2000 | Maes et al. | |
| 6,044,155 A | 3/2000 | Thomlinson et al. | |
| 6,072,876 A | 6/2000 | Obata et al. | |
| 6,141,420 A | 10/2000 | Vanstone et al. | |
| 6,178,507 B1 | 1/2001 | Vanstone | |
| 6,179,205 B1 | 1/2001 | Sloan | |
| 6,226,744 B1 | 5/2001 | Murphy et al. | |
| 6,377,825 B1 | 4/2002 | Kennedy et al. | |
| 6,490,680 B1 | 12/2002 | Scheidt et al. | |
| 6,502,108 B1 | 12/2002 | Day et al. | |
| 6,539,093 B1 | 3/2003 | Asad et al. | |
| 6,636,975 B1 | 10/2003 | Khidekel et al. | |
| 6,643,701 B1 | 11/2003 | Aziz et al. | |
| 6,687,190 B2 | 2/2004 | Momich et al. | |
| 6,691,137 B1 | 2/2004 | Kishi | |
| 6,698,654 B1 | 3/2004 | Zuppicich | |
| 6,734,886 B1 | 5/2004 | Hagan et al. | |
| 6,760,752 B1 | 7/2004 | Liu et al. | |
| 6,804,687 B2 | 10/2004 | Sampson | |
| 6,819,766 B1 | 11/2004 | Weidong | |
| 6,826,686 B1 | 11/2004 | Peyravian | |
| 6,829,712 B1 * | 12/2004 | Madoukh | 726/2 |
| 6,880,037 B2 | 4/2005 | Boyer | |
| 6,880,084 B1 | 4/2005 | Brittenham et al. | |
| 6,898,605 B2 | 5/2005 | Constantino | |
| 6,898,714 B1 * | 5/2005 | Nadalin et al. | 726/5 |
| 6,931,133 B2 | 8/2005 | Andrews et al. | |
| 6,941,326 B2 | 9/2005 | Kadyk et al. | |
| 6,970,970 B2 | 11/2005 | Jung et al. | |
| 6,978,933 B2 | 12/2005 | Yap et al. | |
| 6,986,040 B1 | 1/2006 | Kramer et al. | |
| 7,007,105 B1 | 2/2006 | Sullivan et al. | |
| 7,010,600 B1 | 3/2006 | Prasad et al. | |
| 7,050,589 B2 | 5/2006 | Kwan | |
| 7,051,213 B1 | 5/2006 | Kobayashi et al. | |
| 7,085,386 B2 | 8/2006 | Audebert et al. | |
| 7,114,028 B1 | 9/2006 | Green et al. | |
| 7,156,302 B2 | 1/2007 | Yap et al. | |
| 7,159,763 B2 | 1/2007 | Yap et al. | |
| 7,185,018 B2 | 2/2007 | Archbold et al. | |
| 7,251,728 B2 | 7/2007 | Toh et al. | |
| 7,278,581 B2 | 10/2007 | Ong | |
| 7,299,364 B2 | 11/2007 | Noble et al. | |
| 7,302,585 B1 | 11/2007 | Proudler et al. | |
| 7,356,688 B1 | 4/2008 | Wang | |
| 7,374,099 B2 | 5/2008 | de Jong | |
| 7,386,705 B2 * | 6/2008 | Low et al. | 712/34 |
| 7,437,757 B2 | 10/2008 | Holdsworth | |
| 7,451,921 B2 | 11/2008 | Dowling et al. | |
| 7,475,250 B2 | 1/2009 | Aull et al. | |
| 7,475,256 B2 * | 1/2009 | Cook | 713/189 |
| 7,480,384 B2 | 1/2009 | Peyravian et al. | |
| 7,502,793 B2 | 3/2009 | Snible et al. | |
| 7,515,717 B2 * | 4/2009 | Doyle et al. | 380/277 |
| 7,571,321 B2 * | 8/2009 | Appenzeller et al. | 713/171 |
| 7,602,910 B2 | 10/2009 | Johansson et al. | |
| 7,702,917 B2 | 4/2010 | Tevosyan et al. | |
| 7,769,996 B2 | 8/2010 | Randle et al. | |
| 7,822,209 B2 | 10/2010 | Fu et al. | |
| 7,860,243 B2 | 12/2010 | Zheng et al. | |
| 2001/0008012 A1 | 7/2001 | Kausik | |
| 2001/0036276 A1 | 11/2001 | Ober et al. | |
| 2001/0054148 A1 | 12/2001 | Hoornaert et al. | |
| 2002/0004816 A1 | 1/2002 | Vange et al. | |
| 2002/0007351 A1 | 1/2002 | Hillegass et al. | |
| 2002/0007359 A1 | 1/2002 | Nguyen | |
| 2002/0010679 A1 | 1/2002 | Felsher | |
| 2002/0029343 A1 | 3/2002 | Kurita | |
| 2002/0056044 A1 | 5/2002 | Andersson | |
| 2002/0059144 A1 | 5/2002 | Meffert et al. | |
| 2002/0064095 A1 | 5/2002 | Momich et al. | |
| 2002/0080958 A1 | 6/2002 | Ober et al. | |
| 2002/0099727 A1 | 7/2002 | Kadyk et al. | |
| 2002/0112156 A1 | 8/2002 | Gien et al. | |
| 2002/0120842 A1 * | 8/2002 | Bragstad et al. | 713/156 |
| 2002/0133707 A1 | 9/2002 | Newcombe | |
| 2002/0171546 A1 | 11/2002 | Evans et al. | |
| 2002/0184149 A1 | 12/2002 | Jones | |
| 2002/0188848 A1 * | 12/2002 | Buttiker | 713/175 |
| 2003/0005291 A1 | 1/2003 | Burn | |
| 2003/0012386 A1 | 1/2003 | Kim et al. | |
| 2003/0028664 A1 | 2/2003 | Tan et al. | |
| 2003/0035548 A1 | 2/2003 | Kwan | |
| 2003/0056099 A1 | 3/2003 | Asanoma et al. | |
| 2003/0075610 A1 | 4/2003 | Ong | |
| 2003/0093695 A1 | 5/2003 | Dutta | |
| 2003/0115455 A1 | 6/2003 | Aull et al. | |
| 2003/0115466 A1 | 6/2003 | Aull et al. | |
| 2003/0115467 A1 | 6/2003 | Aull et al. | |
| 2003/0115468 A1 | 6/2003 | Aull et al. | |
| 2003/0167399 A1 | 9/2003 | Audebert et al. | |
| 2003/0172034 A1 | 9/2003 | Schneck et al. | |
| 2004/0034771 A1 * | 2/2004 | Edgett et al. | 713/168 |
| 2004/0042620 A1 | 3/2004 | Andrews et al. | |
| 2004/0053642 A1 | 3/2004 | Sandberg et al. | |
| 2004/0066274 A1 | 4/2004 | Bailey | |
| 2004/0088562 A1 | 5/2004 | Vassilev et al. | |
| 2004/0096055 A1 * | 5/2004 | Williams et al. | 380/1 |
| 2004/0103324 A1 | 5/2004 | Band | |
| 2004/0103325 A1 * | 5/2004 | Priebatsch | 713/202 |
| 2004/0120525 A1 | 6/2004 | Miskimmin et al. | |
| 2004/0144840 A1 | 7/2004 | Lee et al. | |
| 2004/0146163 A1 | 7/2004 | Asokan et al. | |
| 2004/0153451 A1 | 8/2004 | Phillips et al. | |
| 2004/0162786 A1 | 8/2004 | Cross et al. | |
| 2004/0230831 A1 | 11/2004 | Spelman et al. | |
| 2005/0022123 A1 | 1/2005 | Costantino | |
| 2005/0033703 A1 | 2/2005 | Holdsworth | |
| 2005/0039034 A1 * | 2/2005 | Doyle et al. | 713/193 |
| 2005/0109841 A1 | 5/2005 | Ryan et al. | |
| 2005/0114673 A1 | 5/2005 | Raikar et al. | |
| 2005/0119978 A1 | 6/2005 | Ates | |
| 2005/0123142 A1 | 6/2005 | Freeman et al. | |
| 2005/0138386 A1 | 6/2005 | Le Saint | |
| 2005/0138390 A1 | 6/2005 | Adams et al. | |
| 2005/0144312 A1 | 6/2005 | Kadyk et al. | |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188360 A1 | 8/2005 | de Jong | |
| 2005/0216732 A1 | 9/2005 | Kipnis et al. | |
| 2005/0262361 A1 | 11/2005 | Thibadeau | |
| 2005/0279827 A1 | 12/2005 | Mascavage et al. | |
| 2005/0289652 A1 | 12/2005 | Sharma et al. | |
| 2006/0005028 A1 * | 1/2006 | Labaton | 713/176 |
| 2006/0010325 A1 | 1/2006 | Liu et al. | |
| 2006/0015933 A1 | 1/2006 | Ballinger et al. | |
| 2006/0036868 A1 | 2/2006 | Cicchitto | |
| 2006/0043164 A1 | 3/2006 | Dowling et al. | |
| 2006/0072747 A1 | 4/2006 | Wood et al. | |
| 2006/0073812 A1 | 4/2006 | Punaganti Venkata et al. | |
| 2006/0075133 A1 | 4/2006 | Kakivaya et al. | |
| 2006/0075486 A1 | 4/2006 | Lin et al. | |
| 2006/0101111 A1 | 5/2006 | Bouse et al. | |
| 2006/0101506 A1 | 5/2006 | Gallo et al. | |
| 2006/0173848 A1 | 8/2006 | Peterson et al. | |
| 2006/0174104 A1 | 8/2006 | Crickton et al. | |
| 2006/0206932 A1 | 9/2006 | Chong | |
| 2006/0208066 A1 | 9/2006 | Finn et al. | |
| 2006/0226243 A1 | 10/2006 | Dariel | |
| 2006/0274898 A1 * | 12/2006 | Pedlow, Jr. | 380/277 |
| 2006/0291664 A1 | 12/2006 | Suarez et al. | |
| 2006/0294583 A1 | 12/2006 | Cowburn et al. | |
| 2007/0006322 A1 * | 1/2007 | Karimzadeh et al. | 726/27 |
| 2007/0014416 A1 | 1/2007 | Rivera et al. | |
| 2007/0074034 A1 | 3/2007 | Adams et al. | |
| 2007/0112721 A1 | 5/2007 | Archbold et al. | |
| 2007/0113267 A1 * | 5/2007 | Iwanski et al. | 726/2 |
| 2007/0113271 A1 | 5/2007 | Pleunis | |

(56) References Cited

U.S. PATENT DOCUMENTS

| | | |
|---|---|---|
| 2007/0118891 A1 | 5/2007 | Buer |
| 2007/0162967 A1 | 7/2007 | de Jong et al. |
| 2007/0169084 A1 | 7/2007 | Frank et al. |
| 2007/0186095 A1* | 8/2007 | Ganesan et al. .............. 713/155 |
| 2007/0189534 A1 | 8/2007 | Wood et al. |
| 2007/0204333 A1 | 8/2007 | Lear et al. |
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1* | 12/2007 | Relyea .......................... 707/101 |
| 2007/0283163 A1 | 12/2007 | Relyea |
| 2007/0283427 A1 | 12/2007 | Gupta et al. |
| 2007/0288745 A1 | 12/2007 | Kwan et al. |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1* | 6/2008 | Relyea ............................. 707/6 |
| 2008/0148047 A1* | 6/2008 | Appenzeller et al. ......... 713/162 |
| 2008/0189543 A1* | 8/2008 | Parkinson .................... 713/156 |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

OTHER PUBLICATIONS

Cryptographic Message Syntax, R. Housley, Request for Comments (RFC) 2630, Network Working Group, The Internet Society, Jun. 1999.

ATM and Credit Card Notification, Feb. 2005 (internet archive) pp. 1-2 www.thereareplaces.com/infgdes/money.atmnotif.htm.

AMD Announces Specification for Open Platform Management Architecture, Feb. 28, 2005, pp. 1-2 http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Source Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

Balfanz (Dirk ABalfanz, "Access Control for Ad-Hoc Collaboration", Princeton University Jan. 2001).

Schneier, Bruce. Applied cryptography, Second Edition. 1996 John Wiley and Sons, pp. 480-481.

\* cited by examiner

REDUCING A SIZE OF A SECURITY-RELATED DATA OBJECT STORED ON A TOKEN

FIELD OF THE INVENTION

The present invention relates generally to security in a complex heterogeneous multi-user computer environment and more particularly, to reducing the size of a security-related data object stored on a token by storing only a portion of a security certificate.

BACKGROUND OF THE INVENTION

In complex computer systems such as those deployed in many business enterprises, security is an obvious concern. Factors requiring serious consideration in connection with the security environment include mobility, the geographic and physical architecture of the system, and the multi-user nature of the systems. In light of the many factors, tokens have become an acceptable way to ensure that users can connect to the system from any convenient work station, even a home-based or remote Internet based terminal in a secure manner.

In computer network environments, security systems based on PKI are gaining popularity as a way of providing security or enhancing existing security, particularly with regard to security for network connections. Generally speaking, a PKI is an arrangement of servers, clients, and specific information that passes between them, for the verification of user identities by one or more trusted third parties such as, for example, one or more Certification Authorities (CA). The specific information is referred to as a public key and is typically associated with or bound to a particular user or users.

The establishment of a public key is typically accomplished by security or PKI software executing at a central location, such as a server, and operating in a coordinated or sometimes uncoordinated fashion with software at client locations. The public keys are typically provided within security certificates specified under, for example, the PKI Working Group (PKIX) of the Internet Engineering Task Force (IETF), which implement certificate standards based on the International Telecommunication Union-Telecommunication Standardization Sector (ITU-T) Recommendation X.509 ITU-T Recommendation X.509 (1997 E): Information Technology—Open Systems Interconnection—The Directory: Authentication Framework, June 1997 also specified in Comité Consultatif International Téléphonique et Télégraphique (CCITT), Geneva, 1989, Data Communication Networks: Directory, Recommendation X.500-X.521, Blue Book, Volume VIII-Fascicle VIII.8 and International Standards Organization/International Engineering Consortium (ISO/IEC), 25 Dec. 1991, Information Technology—Open Systems Interconnection—The Directory: Authentication Framework, ISO/IEC 9594-8 (CCITT Recommendation X.509). The PKIX further specifies additional aspects in connection with request for comments (RFC) 3280, Housley, R., et al., "Internet X.509 Public Key Infrastructure: Certificate and Certificate Revocation List (CRL) Profile", RFC 3280, April 2002 (supersedes RFC 2459).

Using a PKI, network communications between, for example, a server and a client can be protected such as with a secure socket layer (SSL) connection between the server and client. Originally, SSL was privately developed as a way to provide a secure connection between an Internet web server and a browser operating on a client and has now been adopted as an open security standard by IETF. To operate in a PKI environment, a server wishing to communicate with a client or other network nodes needs to obtain a certificate for validating its identity to the client or other nodes and for allowing an encryption key to be generated for the establishment of the SSL connection. When the client and server first make a connection, the certificate is received by the client and the issuing CA is compared with a root CA certificate stored locally on the client. If the root CA matches the issuing CA then the certificate can be considered trusted. Otherwise a notification can be provided to the client that additional verification steps should be taken to ensure that the server can be "trusted."

A typical certificate contains the name of the server or other entity that is being identified, the server's public key, the name of the issuing CA, and other information including validity dates and cryptographic information proving that the certificate is authentic, and the serial number of the certificate. When an owner of a token is issued a certificate, the certificate and information associated with the certificate are typically stored in a data structure in a memory area of the token. The information generally would include a public key and a private key identifier or the like that would enable the derivation of a private key allowing content encrypted using the private key to be decrypted. In a scenario, for example, where a token owner wishes to connect to a computer system from a client, the token owner can insert the token into a token interface, and, after entering a password or other means of authentication can connect to a system server. If the user wishes to view an encrypted object, such as an email message of which the user is a recipient, the system can search for the private key in order to decrypt the content as specified for example in connection with the secure multi-purpose mail extension (S/MIME) specification as outlined in RFC 2311, "S/MIME Version 2 Message Specification" Dusse, et al., March 1998 or variants thereof. In practice, the private keys associated with S/MIME can be arbitrarily long and in addition a two-step procedure is generally required to access the private key stored in the token. For example, the server can look at the certificate to obtain a public key for the recipient and then the public key can be used to index into a data structure or storage structure located on the token to obtain the private key. The private key can then be used to decrypt the message.

In a typical security scenario, a security token or smart card can be provided with around 5K bytes of storage. Further, a typical private key can be around 128 bytes and a certificate can be around 1K. It will be appreciated that during the course of a user's tenure within a security environment such as an enterprise, certificates will expire, security servers can change, a user's location can change, a user's email address may change, or the like. Any one of the above noted factors may give rise to the user being issued several certificates during a period of time with an enterprise. In order to ensure that any content, such as old emails, encrypted with early certificates are still readable, all private keys must be maintained in the security token if the corresponding content is to be accessed. In conventional implementations, the certificate is generally also stored.

Difficulties arise when even a modestly large number of certificates are required to be stored in a token. Given the above described potential certificate sizes and the potential sizes of the private keys, even the need to store five certificates would exceed the storage capability of a 5K security token. One solution that may first come to mind would be to simply increase token capacity. However, it is understood that as security connections are made to a server, each having token information associated with it, certain server resources, such as operating system kernel memory are consumed. Thus as token sizes are reduced; the number of simultaneous connections that the server can manage can be increased. It will further be appreciated that increasing the size of the security token would undesirably increase the costs associated with token-based security, particularly for large enterprises. Still further, a typical security token is not intended to act as a large capacity storage device for a variety of reasons including security reasons. In other words, in many highly sensitive security applications, it would be undesirable for a user to be able to store and thereby a large amount of sensitive data from a facility, and particularly undesirable to provide a potential storage place for the sensitive data on the security token. It would be desirable therefore to provide an ability to store private key information, such as private key information for multiple certificates, in a manner that would reduce the size of the corresponding security-related objects.

While a background including problems in the art are described hereinabove, with reference to related art or concepts associated with the present invention, the description is not intended to be limiting since the features of the present invention are set forth in the description which follows. Aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a method and system for reducing a size of a security-related object stored in a token such as a smart card, a universal serial bus (USB) token or the like. The security-related object can be stored in a storage structure indexed according to data elements associated therewith including a public key and a private key identifier identifying a private key assigned to an owner of the token, such as a hash of the private key or the like. In accordance with an exemplary procedure, a request to access an encrypted data object such as an email message is received. The request can contain an identity reference such as an issuer name and serial number or a subject key identifier that can be uniquely associated with a certificate, such as, for example, in accordance with a cryptographic message syntax or the like. The certificate is associated with the security-related object and the private key identifier, the private key identifier being necessary to decrypt the encrypted data object. The exemplary procedure can further access the private key identifier in the storage structure using only the identity reference as an index thereby significantly reducing the storage size requirements for the security object on the token since the entire certificate need not be stored. It will be appreciated that in order to retrieve the corresponding private key identifier, a call such as an application program interface (API) command, can be constructed to retrieve the corresponding private key identifier using only the identity reference.

In accordance with another embodiment, an exemplary method of indexing a storage structure on a token is disclosed for reducing a size of a security-related object including a private key identifier identifying a private key assigned to an owner of the token, such as a hash of the private key or the like. The token, which can be a smart card, a USB token, or the like, can be configured to store the security-related object in the storage structure. In accordance with an exemplary procedure, an identity portion only, such as an issuer name and serial number or a subject key identifier, of a certificate associated with the security-related object and the private key identifier can be stored in the storage structure. The storage structure can then be indexed such that the private key identifier is indexed in association with the identity portion. In accordance with the embodiment and other embodiments, additional portions of the certificate are not stored in the storage structure. The private key identifier can then be retrieved by searching the storage structure using only the identity portion. The retrieval can be conducted, for example, in response to a requirement to decrypt a data object such as an email or the like. The corresponding private key identifier retrieved from the storage structure can be used to decrypt the data object.

In accordance with other embodiments, a security token in a computer system is disclosed, the security token for storing security-related objects. The exemplary security token includes an interface capable of connecting the token and the computer system, a memory and a processor. The memory is configured with an indexable storage structure for storing the security objects. The processor is coupled to the interface and the memory through a conventional connection mechanism such as a data bus or the like, and is configured to receive a private key identifier and an identity portion of a certificate. It will be appreciated that the certificate is issued in connection with a security operation associated with an owner of the security token. The identity portion includes, for example an issuer name and serial number or a subject key identifier and represents less than the full amount of information typically associated with the certificate in order to reduce the size of the security object and the overall size of the storage structure required. The identity portion of the certificate is stored in the indexable storage structure in association with the private key identifier, such that the storage structure can be accessed using the identity portion only as an index to the private key identifier thus reducing the amount of information needed to be stored and reducing or eliminating any intermediate steps.

In accordance with another embodiment, a security token in a computer system is disclosed, the security token configured for storing security-related objects. The exemplary security token includes an interface capable of connecting the token and the computer system, a memory and a processor. The memory is configured with an indexable storage structure for storing the security objects. Each of the security objects include a private key identifier stored in association with an identity portion of a certificate issued to an owner of the security token. The identity portion includes, for example an issuer name and serial number or a subject key identifier and represents less than the full amount of information typically associated with the certificate in order to reduce the size of the security object and the overall size of the storage structure required. The processor can be coupled to the interface and the memory using conventional connection mechanisms such as a data bus or the like. The processor is configured to receive a request for the private key identifier in connection with a decrypting operation such as an operation for decrypting an email or the like. The private key identifier can be retrieved by indexing into the storage structure using only the identity portion of the certificate. The identity portion includes an issuer and a serial number or a subject key identifier associated with the certificate.

In accordance with yet another embodiment, a client is disclosed in a multi-user computer system accessed using a token, the client for providing access to an encrypted message such as an email or the like. The token includes a memory with an indexable storage structure for storing security objects including an identity portion and a private key identifier associated with a certificate issued to an owner of the token. The identity portion includes an issuer and a serial number or a subject key identifier. The storage structure is indexed such that the private key identifier is accessible using only the identity portion. The exemplary client includes a system interface for connecting to the multi-user computer system, a token interface, and a processor. The processor is preferably coupled to the token interface and the system interface, and configured to receive a request to decrypt the encrypted message using the private key identifier. Since the client can be, for example an email client, the request can include the identity portion, which can be included in the message and obtained by the email client. The private key identifier can then be retrieved by indexing the storage structure using the identity portion.

In accordance with still another embodiment, a client is disclosed in a multi-user computer system accessed using a token. The token has a memory including an indexable storage structure for storing security objects, and can include a system interface for connecting to the multi-user computer system, a token interface, and a processor. The processor is coupled to the token interface and the system interface through a conventional connection mechanism such as a data bus or the like. The processor can be configured to receive a certificate including an identity portion and a private key identifier, the certificate issued to an owner of the token. The identity portion can include an issuer and a serial number or a subject key identifier. The identity portion and the private key identifier are transferred to the token such that the identity portion and the private key identifier are stored in the storage structure. It will be appreciated that the storage structure is indexed such that the private key identifier is accessible using only the identity portion. The processor can receive a request to decrypt an encrypted message such as an email using the private key identifier. The request can accordingly include the identity portion. The private key identifier can then be retrieved by indexing the storage structure using the identity portion.

It will be appreciated that the exemplary embodiments described herein rely on an email, message or the like addressed to a recipient such as a token owner to be encrypted using a compatible encryption method. Also, identity information of a certificate associated with the recipient should be included. If the token owner then wishes to access an encrypted data object, such as an email message stored on a server, a query to the token for a private key identifier can be constructed using information such as an issuer and a serial number of the certificate issued to the owner or a subject key identifier as outline for example in connection with the cryptographic message syntax (CMS) as outlined for example in section 6.2, et seq., of RFC 3852, Housley, R., "Cryptographic Message Syntax (CMS)", RFC 3852, July 2004 (supersedes RFC 3369).

Reference will now be made in detail to exemplary embodiments of the invention, which are illustrated in the accompanying drawings. Wherever possible, the same reference numbers will be used throughout the drawings to refer to the same or like parts.

Figure 1:
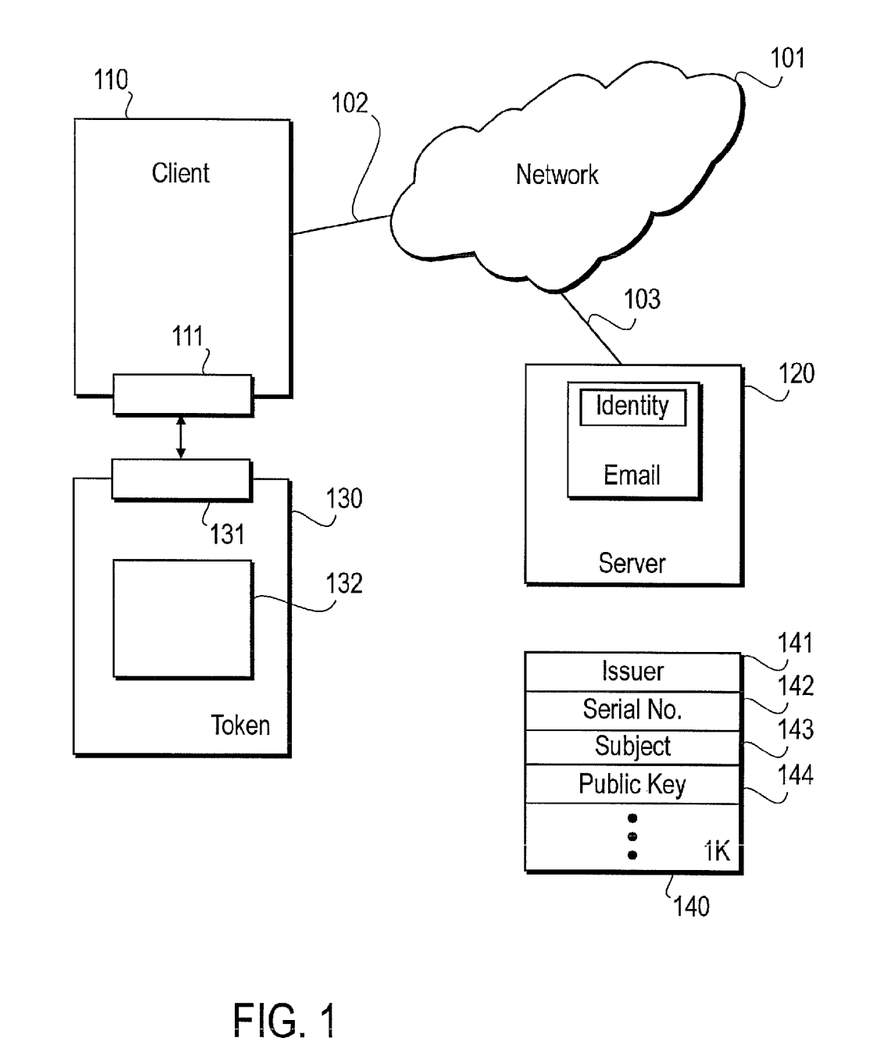
FIG. 1 is a diagram illustrating exemplary components of a computer system consistent with embodiments of the present invention.

Referring now to FIG. 1, a simplified and representative environment 100 associated with a multi-user computer system accessed using a token will be discussed and described. The basic representative environment includes a client 110, a network 101, a server 120 and a token 130. The client 110, and the server 120 can be connected to each other through the network 101 through connections 102 and 103 respectively, which can be any one of a number of different types of wired or wireless connections as would be appreciated in the art. It will be appreciated that in an enterprise environment, the client 110 and the server 120 can also be coupled more directly through an intra-net or the like. The client 110 can be connected to the token 130 through an interface 111 which can be a connector such as a universal serial bus (USB) connector, edge connector, or some other connection mechanism. The interface 111 also includes any necessary processing capability or the like such that protocols associated with the low level transfer and exchange of information can be successfully conducted. The token 130 can also include an interface 131 to conduct similar physical and electronic interfacing with the client 110. The token 130 includes a memory area 132, which is shown as being around 5 Kbytes in capacity. The capacity of the memory area 132 can be larger or smaller, however as the size of the memory area 132 is increased, performance issues for the client 110 can arise in connection with the consumption of kernel memory associated with the operating system of client 110. That is, as described herein above, as more tokens with greater memory requirements are plugged at the same time, the kernel memory is consumed and the speed of the operating system in handling token operations can be compromised.

The server 129 can include an email process 121 including a repository of, for example, stored electronic mail messages (emails) that have been accumulated over time associated with users in the system. The stored emails are typically encrypted using certificates that are contemporaneous with the time of sending of individual email messages. Thus, older emails may have been encrypted using certificates that are now expired. It will be appreciated that an exemplary certificate 140 can include an issuer name 131, a certificate serial number 132, a subject 143, a public key 144 and additional information such as extensions and the like described in connection with for example the X.509 standard. A full size for certificate 140 can be around 1 Kbytes, therefore it can be appreciated that if a number of certificates must be maintained for decrypting an extensive collection of emails, the storage capacity of memory area 132 could easily be exceeded.

Figure 2A:
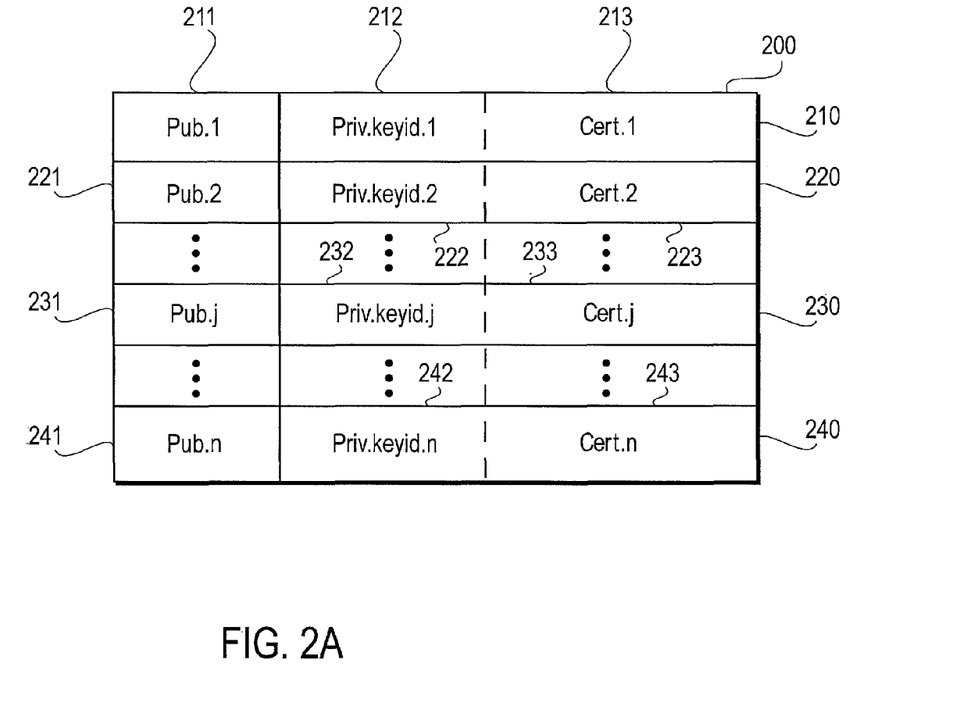
FIG. 2A is a diagram illustrating a storage structure for storing private key information that includes certificate storage.

As certificates are accumulated by a user of the token 130, a memory or storage area, such as storage structure 200, shown in FIG. 2A can be constructed and populated. The structure 200 can be organized with information such as public keys, private key identifiers, and entire certificates. Thus, a number of security or security-related objects such as security objects 210, 220, 230 and 240 can be entered into the storage structure 200. For security object 210, a public key 1 211, a private key identifier 1 212, and a certificate 1 213 can be stored. For security object 220, a public key 2 221, a private key identifier 2 222, and a certificate 2 223 can be stored. For security object 230, a public key "j" 231, a private key identifier "j" 232, and a certificate "j" 233 can be stored. For security object-240, a public key "n" 241, a private key identifier "n" 242, and a certificate "n" 243 can be stored.

Figure 2B:
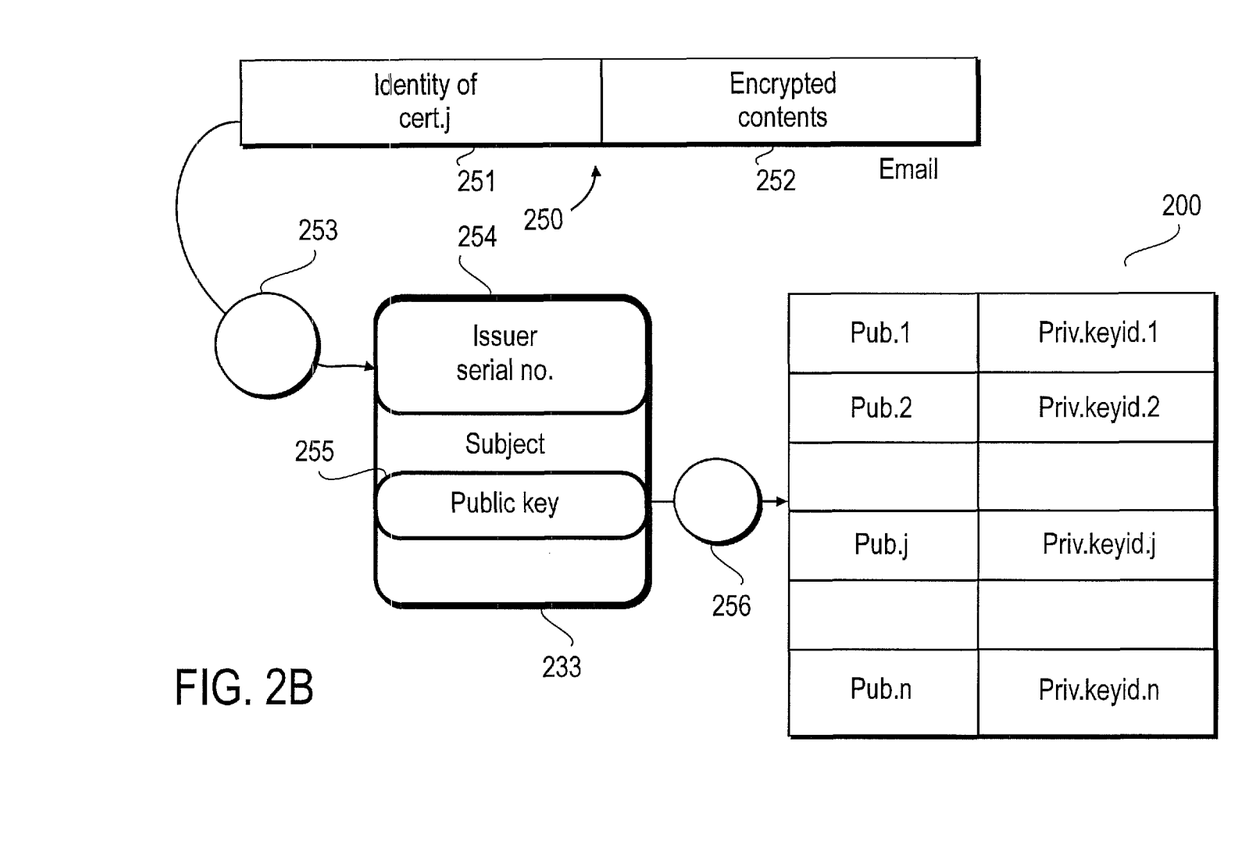
FIG. 2B is a diagram illustrating an two-stage procedure for indexing into a storage structure to access a private key using information obtained from a certificate in a separate step.

With reference to FIG. 2B, if an encrypted data object 250, such as an email message, is accessed, for example by an email client or the like, then a two-step process is invoked. It will be appreciated that in some embodiments, the data object 250 is an S/MIME encrypted email according to the relevant standard. The data object 250 includes an encrypted payload 252 and an identity field 251 having identity information associated with a certificate "j." In order for the data object 250 to have been encrypted and directed to the recipient, the certificate "j" 233 must have been previously issued to the recipient then who was subsequently included as a recipient in the message thread associated with the data object 250. In a typical scenario, a process 253 uses the identity field 251 to look up corresponding information 254 in the certificate "j" 233 that can be used to index into the storage structure 200, such as a public key 255 or a hash of the public key 255. The public key 255, in this case public key "j" 231 can then be used in process 256 to index into storage structure 200 to find, for example, private key identifier "j" 232. As noted the storage of certificates 1 213, certificate 2 223, certificate "j" 233 and certificate "n" 243 requires excessive capacity in storage structure 200 and, as can be seen in the above noted example, requires an extra step of looking up the public key information, such as process 253 to complete the private key identifier retrieval necessary to decrypt the message.

Figure 3A:
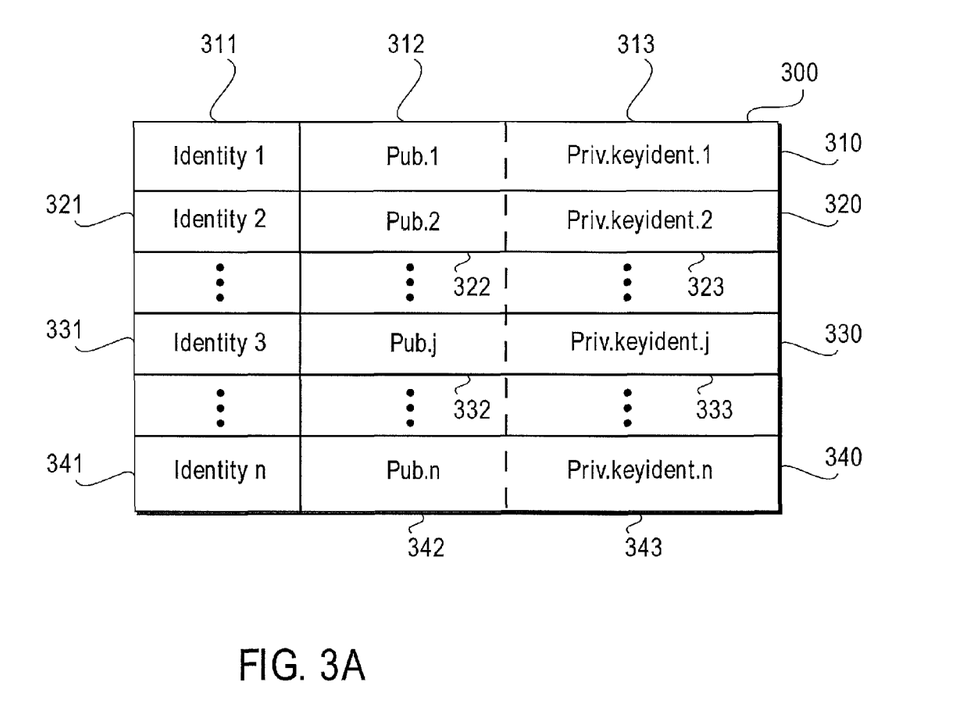
FIG. 3A is a diagram illustrating a storage structure that does not include certificate storage.

A more efficient manner of obtaining the private key identifier information is shown in FIG. 3A. Therein, a storage structure 300 can be constructed and populated with information that does not include the entire certificate. Immediate reduction in size for the storage structure 300 can thereby be realized. As can be seen a security object 310, 320, 330 and 340 can be included in storage structure 300 and can be populated with identity information and private key identifier information. The public key information can also be included. However, the identifier information may include information derived from the public key such as a hash of the public key. Thus for security object 310, a identity portion 1 311, which can be an issuer and a serial number associated with certificate 1 or alternatively a subject key identifier uniquely associated with the certificate 1. The security object 310 further includes a public key 1 312 and a private key identifier 1 313. The security object 320 includes an identity portion 2 321, a public key 2 322 and a private key identifier 2 323. The security object 330 includes an identity portion "j" 331, a public key "j" 332 and a private key identifier "j" 333. The security object 340 includes an identity portion "n" 341, a public key "n" 342 and a private key identifier "n" 343.

Figure 3B:
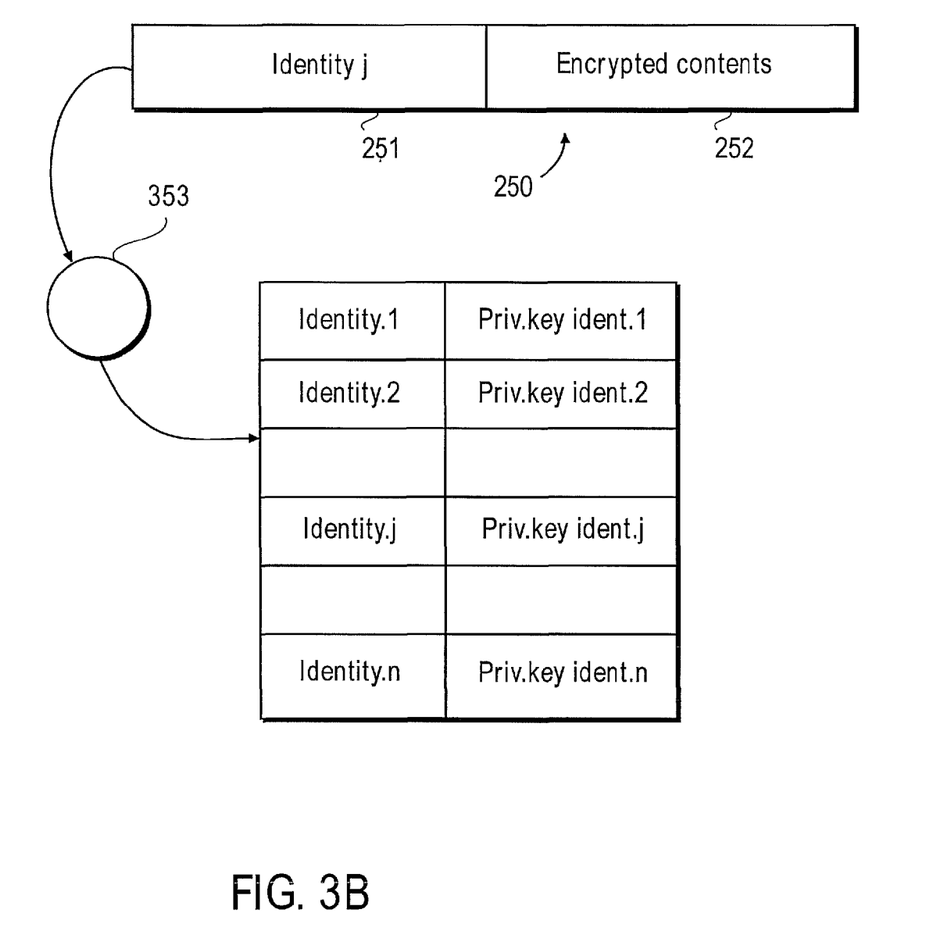
FIG. 3B is a diagram illustrating an exemplary one-stage procedure for indexing into a storage structure to access a private key using identification information.

With reference to FIG. 3B, if the encrypted data object 250 is accessed, for example by an email client or the like, then a one step process is invoked. In an exemplary scenario, a process 353 uses the identity field 251 to index directly into the storage structure 300, to find, for example, private key identifier "j" 333 significantly reducing the private key identifier access time and thereby the decryption time.

Figure 4:
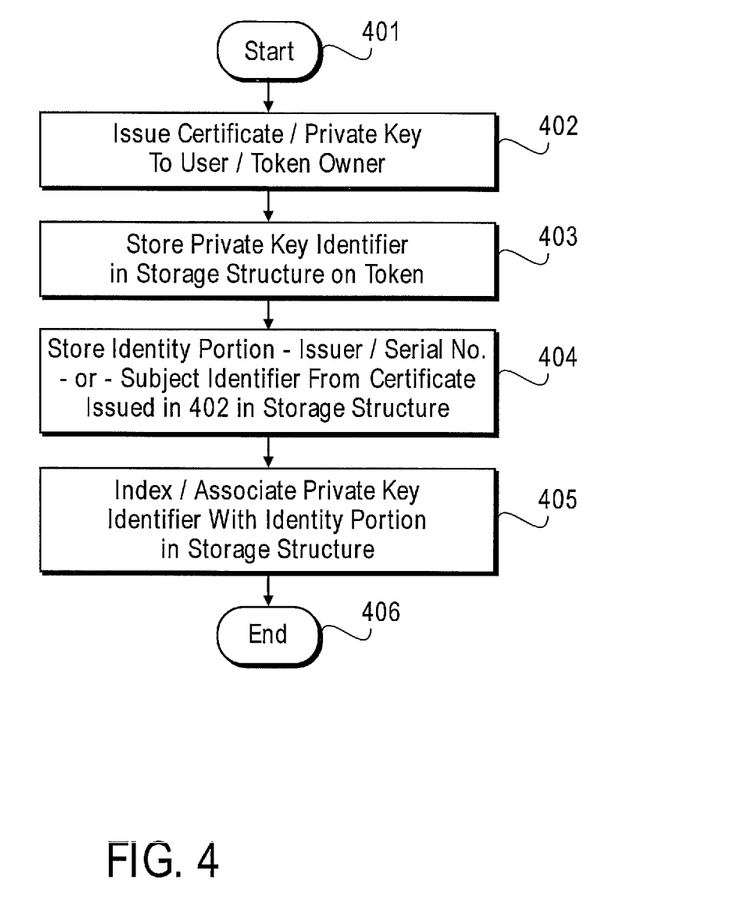
FIG. 4 is a flow chart illustrating an exemplary procedure for, inter alia, indexing a storage structure on a security token in accordance with the present invention.

In accordance with various embodiments, an exemplary procedure for indexing a storage structure is shown in FIG. 4. After start at 401, a certificate can be issued to an owner or a user of a token including a private key at 402. After issuance of the certificate, the private key, or more accurately an identifier associated with the private key from which information necessary to decrypt a message can be derived, can be stored at 403 on the token in an storage structure. The private key identifier can be stored as an element of a security object stored in connection with the certificate such that any content encrypted using the private key information can be decrypted, even if the certificate expires. The identity information associated with the certificate such as the issuer and serial number pair, or the subject key identifier, as specified under the CMS standard can be stored in the storage structure at 404. The storage structure can then be indexed or associated such that the identity information is associated with the private key identifier at 405 such that the private key identifier can be located based on having the identity information, such as from the encrypted email message. While the exemplary procedure is indicated as ending at 406, it will be appreciated that the procedure can be repeated for every certificate that is issued to the token owner corresponding to content that must, at least eventually be decrypted.

Figure 5:
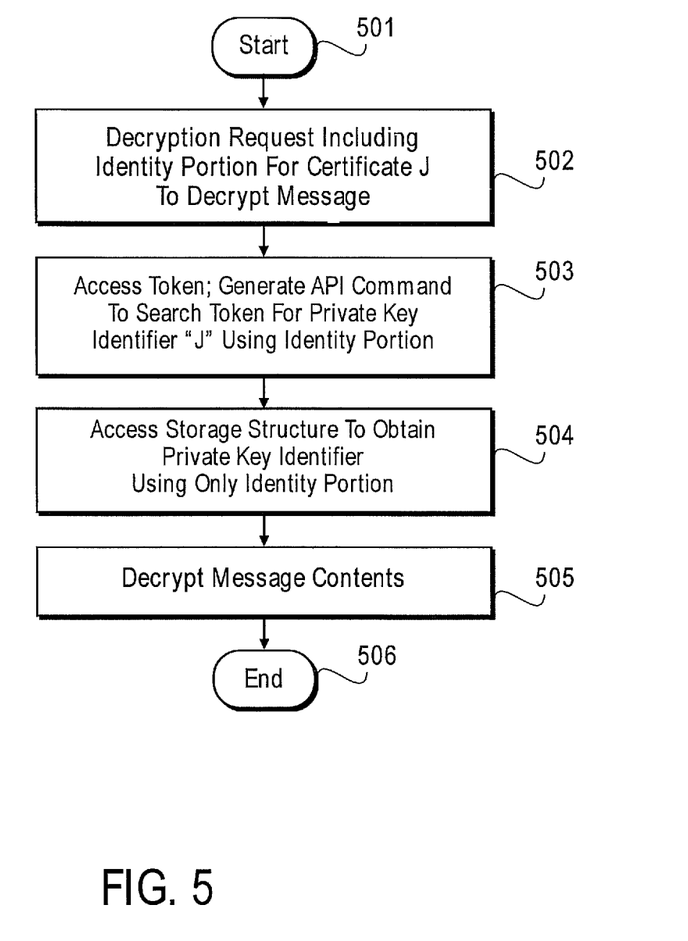
FIG. 5 is a flow chart illustrating an exemplary procedure for, inter alia, accessing a storage structure in a token to access a private key in accordance with the present invention.

Another exemplary procedure for retrieving information from a storage structure is shown in FIG. 5. After start at 501, a decryption request can be generated or other mechanism for generating a requirement to decrypt an encrypted data object such as an email can be constructed using the identity information provided from the data object at 502. The token can be accessed and a request can be generated, such as using an API with token query commands, to obtain the private key identifier by searching the token at 503. The storage structure of the token can be accessed and, using the identity information from the data object 502, the storage structure can be indexed and the private key identifier obtained at 504 or otherwise retrieved. The contents of the data object 502 can be decrypted at 505. While the exemplary procedure is indicated as ending at 506, it will be appreciated that the procedure can be repeated for every such data object or email that must be decrypted.

Figure 6:
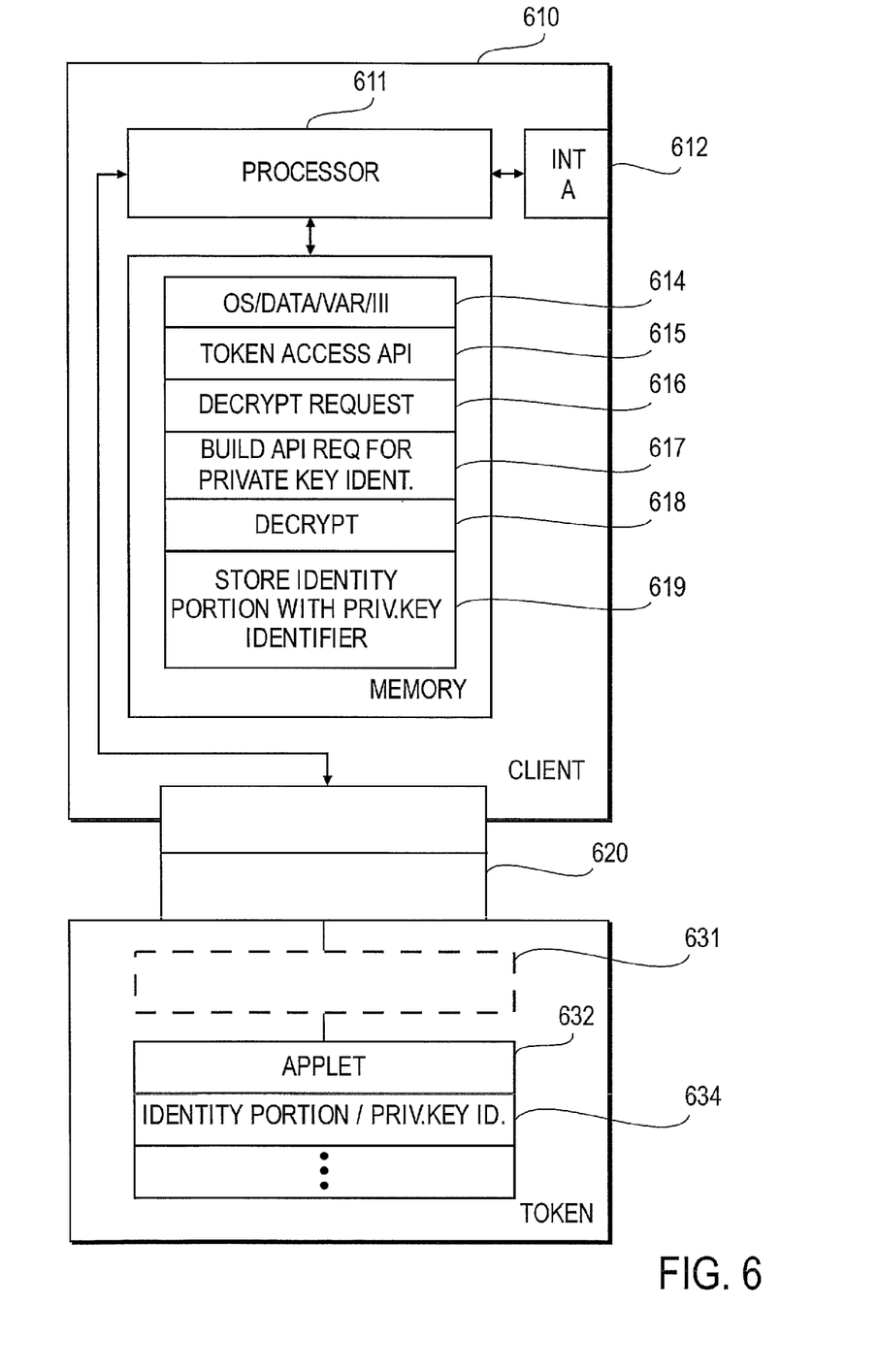
FIG. 6 is a block diagram illustrating portions of an exemplary client and token in accordance with the present invention.

In some embodiments, the exemplary procedures described herein can be implemented in an apparatus as shown in FIG. 6, which can be an exemplary computer such as a client 610 having a processor 611 configured to execute computer instructions stored in memory 613, or other computer readable medium, causing all or various portions of the procedure to be carried out. The client 610 can also be configured with an interface 612, which, when operating in connection with the processor 610 can be used to facilitate a network or intranet connection and exchange and transfer of information associated with a computer system and an external repository of encrypted content such as an email server. The apparatus can also include a token such as a security token 630, which can be a smart card, a universal serial bus (USB) token or any other type of token. The token 630 can optionally include a processor 631 for executing small, compact applications or applets, for example that could be used to support storage and retrieval functions associated with a memory area 632. Applets can be stored, for example in the memory area at 633 and the storage structure such as the identity information and private key identifier can be stored at 634.

The memory 613 can store the usual information such as operating system software, data, variables, and applications, including the exemplary procedures, at 614. A token access application program interface (API) can also be stored at 615 such that calls to the token to retrieve information can be made. In the process of examining email content such as through operation of an email client, a request can be generated at 616 to decrypt a data object such as an email message by attempting to access and read the email content. The request will precipitate the building of a call to the token, for example though operation of a command associated with the token access API, at 617 to access the token and obtain the private key identifier from the token using only the identity information such as the issuer and serial number of a corresponding certificate or a subject key identifier uniquely associated with the certificate. The private key identifier can be obtained and contents from the encrypted data object can be decrypted at 618. In some embodiments as described herein, new identity information can be stored on the token and associated or otherwise indexed with the private key identifier at 619.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   storing a security-related object in a storage structure in a token, wherein the security-related object comprises:
   an identity reference that identifies a certificate assigned to an owner of the token, wherein the identity reference comprises an issuer name and a serial number associated with the certificate, and
   a private key identifier, separate from the certificate, that identifies a private key associated with the certificate and assigned to the owner of the token, and
   wherein the storage structure is indexed according to the identity reference;
   receiving a request to access an encrypted data object, the request containing the identity reference that identifies the certificate; and
   accessing, by a processor device, the private key identifier in the storage structure in the token using only the identity reference as an index,
   wherein the private key identifier is used to decrypt the encrypted data object and wherein accessing the private key identifier comprises constructing an application program interface (API) command to retrieve the corresponding private key identifier using only the identity reference.

2. The method of claim 1, wherein the encrypted data object comprises an email message.

3. The method of claim 1, wherein the identity reference comprises a key identifier associated with the certificate.

4. The method of claim 1, wherein the token is one of a smartcard and a universal serial bus (USB) token.

5. A non-transitory computer readable medium comprising computer executable instructions to cause a processor device to perform operations comprising:
   storing a security-related object in a storage structure in a token,
   wherein the security-related object comprises:
   an identity reference that identifies a certificate assigned to an owner of the token, wherein the identity reference comprises an issuer name and a serial number associated with the certificate, and
   a private key identifier, separate from the certificate, that identifies a private key associated with the certificate and assigned to the owner of the token, and
   wherein the storage structure is indexed according to the identity reference;
   receiving a request to access an encrypted data object, the request containing the identity reference that identifies the certificate; and
   accessing, by the processor device, the private key identifier in the storage structure in the token using only the identity reference as an index,
   wherein the private key identifier is used to decrypt the encrypted data object and wherein accessing the private key identifier comprises constructing an application program interface (API) command to retrieve the corresponding private key identifier using only the identity reference.

6. A method comprising:
   receiving a public key infrastructure (PKI) certificate assigned to an owner of a token;
   extracting an identity portion from the PKI certificate, wherein the identity portion comprises an issuer name and a serial number associated with the certificate;
   creating a private key identifier for a private key associated with the PKI certificate and separate from the PKI certificate, wherein the private key is assigned to the owner of the token;
   storing, in a security-related object in a storage structure on the token, data comprising the identity portion from the PKI certificate and the private key identifier; and
   indexing, by a processor device, the storage structure such that the private key identifier is indexed in association with the identity portion from the PKI certificate,
   wherein additional portions of the PKI certificate are not stored in the storage structure and wherein the identity portion is accessible by a computer system to construct an application program interface (API) command to retrieve the corresponding private key identifier using only the identity portion.

7. The method of claim 6, further comprising:
   retrieving the private key identifier by searching the storage structure using only the identity portion in response to a request to decrypt a data object; and
   decrypting the data object using the retrieved private key identifier.

8. The method of claim 7, wherein the data object comprises an email message.

9. A security token comprising:
   an interface to connect to a computer system;
   a memory comprising an indexable storage structure to store security-related objects; and
   a hardware processor coupled to the interface and the memory, the hardware processor to:
   receive a private key identifier that identifies a private key for a public key infrastructure (PKI) certificate assigned to an owner of the security token and an identity portion of the PKI certificate issued in connection with a security operation associated with the owner of the security token, the identity portion comprising an issuer name and a serial number associated with the PKI certificate, wherein the identity portion positively identifies the PKI certificate and wherein the private key identifier is separate from the PKI certificate, and store a security related object comprising the identity portion of the PKI certificate in the indexable storage structure in association with the private key identifier, such that the storage structure can be accessed using the identity portion that positively identifies the PKI certificate as an index to the private key identifier, wherein the identity portion is accessible by the computer system to construct an application program interface (API) command to retrieve the corresponding private key identifier using only the identity portion.

10. A security token comprising:

an interface to connect the security token and a computer system;

a memory to store an indexable storage structure to store security-related objects, a security-related object comprising a private key identifier that identifies a private key for a public key infrastructure (PKI) certificate issued to an owner of the security token stored in association with an identity portion of the PKI certificate issued to the owner of the security token, the identity portion comprising an issuer name and a serial number associated with the PKI certificate, wherein the identity portion is accessible by the computer system to construct an application program interface (API) command to retrieve the corresponding private key identifier using only the identity portion and wherein the identity portion positively identifies the PKI certificate and wherein the private key identifier is separate from the PKI certificate; and a hardware processor coupled to the interface and the memory, the hardware processor to:

receive a request for the private key identifier in connection with a decrypting operation, and retrieve the private key identifier by indexing into the storage structure using only the identity portion of the PKI certificate.

11. A system comprising:

a hardware token interface to connect to a token, wherein the token comprises a memory comprising an indexable storage structure to store a security object comprising:

an identity portion from a public-key infrastructure (PKI) certificate issued to an owner of the token, wherein the identity portion identifies the PKI certificate and wherein the identity portion comprises an issuer name and a serial number associated with the PKI certificate and wherein the identity portion is accessible by a computer system to construct an application program interface (API) command to retrieve the corresponding private key identifier using only the identity portion; and a private key identifier, separate from the PKI certificate, that identifies a private key associated with the PKI certificate issued to the owner of the token; and a processor coupled to the token interface, the processor to:

receive a request to decrypt an encrypted message using the private key identifier, the request comprising the identity portion;

retrieve the private key identifier by indexing the storage structure in the token using the identity portion that identifies the PKI certificate, wherein the storage structure is indexed such that the private key identifier is accessible using only the identity portion.

12. A system comprising:

a token interface to connect to a token, wherein the token comprises a memory comprising an indexable storage structure to store security-related objects; and a hardware processor coupled to the token interface, the hardware processor to:

receive a public-key infrastructure (PKI) certificate comprising an identity portion that identifies the PKI certificate, wherein the identity portion comprises an issuer name and a serial number associated with the PKI certificate and wherein the PKI certificate is issued to an owner of the token;

obtain a private key identifier, separate from the PM certificate, that identifies a private key associated with the PKI certificate issued to the owner of the token;

transfer a security-related object comprising the identity portion and the private key identifier to the token via the token interface such that the identity portion and the private key identifier are stored in the storage structure, wherein, the storage structure is indexed such that the private key identifier is accessible using only the identity portion that identifies the PKI certificate; and retrieve the private key identifier by indexing the storage structure using the identity portion, wherein retrieve retrieving the private key identifier comprises constructing an application program interface (API) command to retrieve the corresponding private key identifier using only the identity portion.

13. The system of claim 12, wherein the hardware processor is further to:

receive a request to decrypt an encrypted message using the private key identifier, the request comprising the identity portion.

* * * * *